(No Model.)
W. G. GASS.
TRANSMITTING GEARING.
No. 326,861. Patented Sept. 22, 1885.
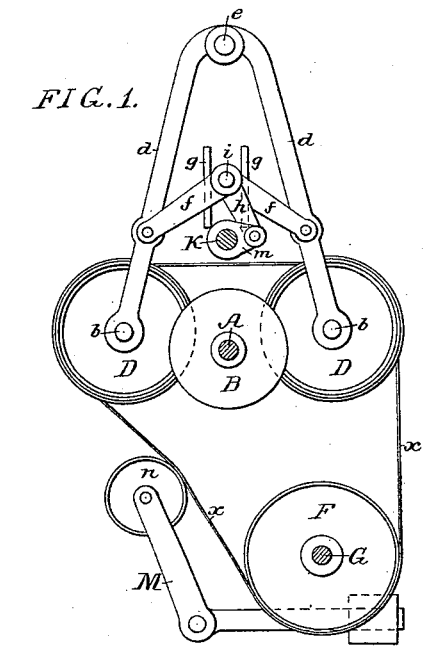
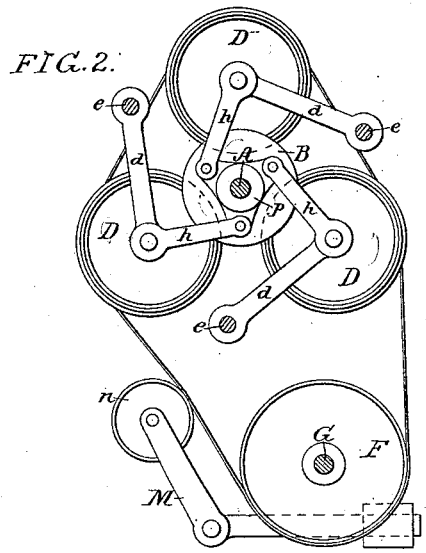
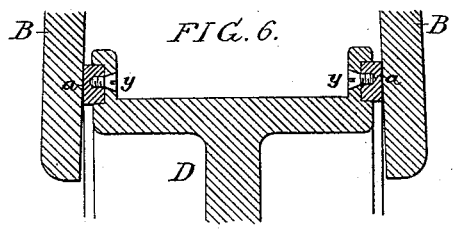
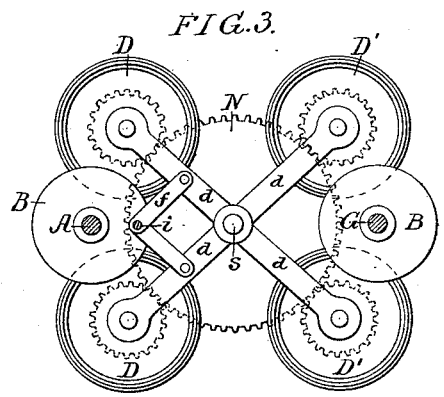
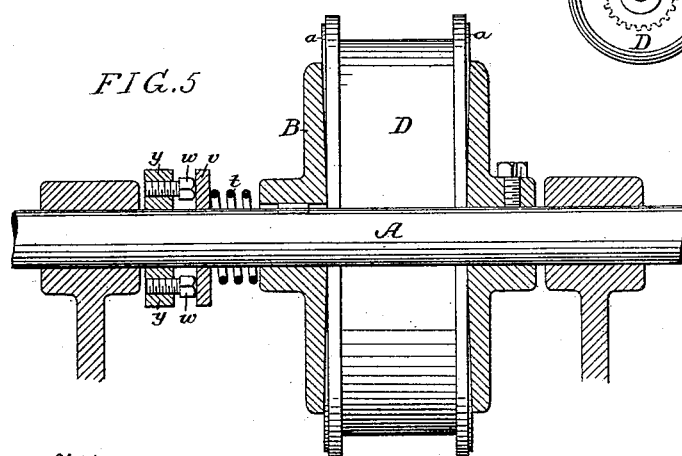
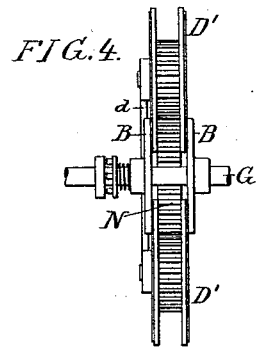
Witnesses
Henry Bossert
William F. Davis
Inventor:
William G. Gass
by his Attorneys
Howson & Son

UNITED STATES PATENT OFFICE.

WILLIAM GEORGE GASS, OF PHILADELPHIA, PENNSYLVANIA.

TRANSMITTING-GEARING.

SPECIFICATION forming part of Letters Patent No. 326,861, dated September 22, 1885.

Application filed May 11, 1885. (No model.)

*To all whom it may concern:*

Be it known that I, WILLIAM GEORGE GASS, a subject of the Queen of Great Britain and Ireland, and a resident of Philadelphia, Pennsylvania, have invented certain Improvements in Transmitting-Gearing, of which the following is a specification.

My invention relates to certain improvements in that class of friction-gear in which power is transmitted from one disk to another by a pair of intervening disks having a frictional hold upon the sides of the driving-disk and the disk to be driven.

The object of my invention is to so construct friction-gear of this class that two or more shafts can be driven from a single driving-shaft, or the device rendered available for the transmission of greater power than usual. This object I attain in the manner hereinafter set forth, reference being had to the accompanying drawings, in which—

Figures 1, 2, and 3 are diagrams illustrating different arrangements of gearing for carrying out my invention; Fig. 4, an end view of the gearing shown in Fig. 3; Fig. 5, an enlarged sectional view illustrating the construction of the gearing; and Fig. 6 a sectional view on a still larger scale, showing the construction of part of the same.

In ordinary friction-gear of the class to which my invention relates a wheel or disk on a driving-shaft has near the periphery an annular flange, which is clamped between a pair of disks carried by a second shaft, and one or both under the influence of a spring, the shaft to be driven having a wheel or disk similar to the first, and also clamped between the intermediate disks, so that the latter serve to transmit power from the driving-shaft to the driven shaft, the speed and power being regulated by shifting the transmitting-disks so that the point of contact between the disk on the driving-shaft and the transmitting-disks may be nearer to or farther from the center of the latter than the point of contact between said transmitting-disks and the disk on the driven shaft. I modify this arrangement by using the shaft carrying the two disks as the driving-shaft, so that two or more wheels can be driven thereby. I am thus enabled to impart power to two or more independent shafts, or by connecting the driven wheels or disks by belts or other gearing to a wheel or pulley on a driven shaft can increase the power capable of being transmitted by the gearing.

Various arrangements may be used for the purpose within the scope of my invention. Thus, in Fig. 1 A represents the driving-shaft, carrying the disks B B, Fig. 5, and D D two disks which have projecting flanges, *a*, Fig. 6, of leather or like frictional material, these flanges being clamped between the disks on the shaft A, and being carried by shafts or spindles *b*, which are thus driven independently of each other from the shaft A.

The disks D may be constructed, as shown in Fig. 5, so as to form pulleys for the reception of a belt, *x*, which also passes around a pulley, F, on a shaft, G, to be driven, so that more power than usual can be imparted to this shaft, owing to the fact that the flanges of both disks D in contact with the disks B form driving-surfaces, whereas in the ordinary arrangement, in which the disks B are simply transmitting-disks, the driving-surface is limited to the flange of but one disk.

In order to vary the speed of the driven shaft in respect of that of the driving-shaft, the disks D are made adjustable simultaneously from and toward the shaft A, the spindles *b* of the disks being carried by arms *d*, pivoted to a pin, *e*, and in order to effect the simultaneous adjustment of the disks the arms *d* are connected by links *f*, forming a toggle, the center pin, *i*, of which is adapted to central guides, *g*, and is connected by a rod, *h*, to a crank, *m*, on a shaft, K, which may be operated either continuously or intermittently, and by hand or otherwise, in order to effect the adjustment of the arms *d* and their disks D.

A weighted lever, M, carries a roller, *n*, which bears upon the belt *x* and serves to keep the same tight irrespective of the position of the disks D.

More than two power-transmitting disks D may be used in connection with the shaft A and its disks B, and the shaft G with its pulley F. For instance, in Fig. 2 I have shown three such disks, hung to arms *d*, so pivoted that the disks are free to swing from and toward the shaft A, these arms being connected by rods *h* to a three-armed sleeve, *p*, on the shaft A.

In Fig. 3 I have shown an arrangement in which four disks, D D and D' D', are used, only two of these disks, however, being drivers, the other two being transmitting-disks. In this case the disks are toothed and are geared together by an intermediate dead-wheel, N, the two drivers D D being carried by the ends of levers d, hung to the shaft of the dead-wheel, the opposite ends of said levers carrying the transmitting-wheels D', the flanges of which are gripped between disks B on the driven shaft G. The levers d d are connected by toggle-arms f to a movable pin, i, so that simultaneous adjustment of both levers may be effected. This provides for a greater range of speed than in the devices shown in Figs. 1 and 2. Thus, if the disks D are moved toward the center of the driving-disks B, their speed is decreased, and at the same time the disks D' are moved away from the center of the disks B of the driven shaft, so as also to decrease the speed of the latter, the reduction in the speed of the driven shaft in respect to that of the driving-shaft being the product of both reductions. Increase of speed is, as will be evident, in the same ratio.

As shown in Fig 5, one of the disks B is bolted to the shaft A, but the other disk is keyed to the shaft, but free to move longitudinally thereon, and is acted upon by a spring, t, which has its outer bearing against a ring, v, capable of adjustment on the shaft by means of set-screws w, carried by a collar, y, secured to the shaft, so that the pressure of the spring upon the disk and the grip of the disks B upon the flanges of the disk D can be readily regulated.

The flanges a consist of rings adapted to grooves in the faces of the disks D, as shown in Fig. 5, and secured therein by screws y, or other means, so that when worn they can be readily removed and new ones inserted.

The faces of the disks B may, if desired, be covered with leather to increase the frictional hold of the same upon the disks D.

I claim as my invention—

1. The combination of a driving-shaft, having disks B, with two or more independent shafts or spindles, each having a wheel or disk clamped between and driven by frictional contact with the faces of the disks on the driving-shaft, as set forth.

2. The combination of a driving shaft, having disks B, with two or more shafts or spindles, each having a wheel or disk clamped between and driven by frictional contact with the faces of the disks B, and adjustable from and toward the driving-shaft, as set forth.

3. The combination of a driving-shaft having disks B, a shaft, G, to be driven, and two or more wheels or disks geared to or having a driving connection with the shaft G, and clamped between and driven by frictional contact with the faces of the disks B, as set forth.

4. The combination of a driving-shaft having disks B, a shaft, G, to be driven, two or more wheels or disks, D, geared to or having a driving connection with the shaft G, and clamped between and driven by frictional contact with the faces of the disks B, and mechanism for simultaneously adjusting the said wheels or disks D from and toward the shaft A, as set forth.

5. The combination of a driving-shaft having disks B, a driven shaft, G, also having disks B, two or more wheels or disks, D, clamped between and in frictional contact with the faces of the disks B of the driving-shaft, two or more similar wheels or disks, D', occupying a like relation to the disks B of the driven shaft and geared to or having a driving connection with the wheels or disks D, and mechanism for simultaneously adjusting the wheels D in one direction and the wheels D' in the opposite direction, as set forth.

6. The combination of the shaft A, the disk B, movable thereon, the spring t, the ring v, bearing thereon, and the collar y, secured to the shaft and having set-screws acting upon the ring v, as specified.

7. The disks D, having detachable rings or flanges a, as specified.

In testimony whereof I have signed my name to this specification in the presence of two subscribing witnesses.

WM. GEORGE GASS.

Witnesses:
HENRY BOSSERT,
HARRY SMITH.